Figure 1:
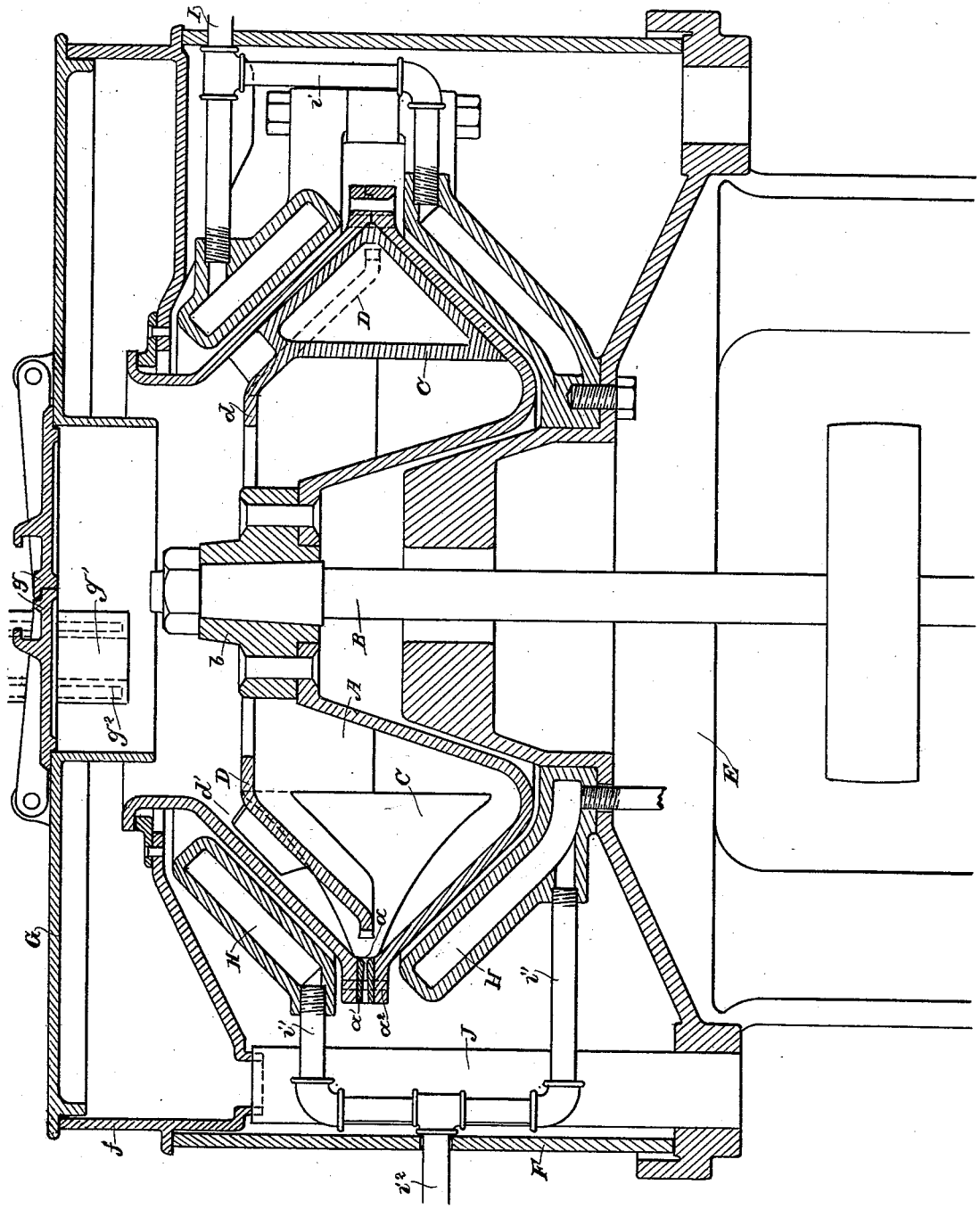

(No Model.) 2 Sheets—Sheet 2.
A. F. L. BELL.
CENTRIFUGAL LIQUID SEPARATOR.

No. 508,270. Patented Nov. 7, 1893.

UNITED STATES PATENT OFFICE.

ARTHUR F. L. BELL, OF SAN FRANCISCO, CALIFORNIA, ASSIGNOR TO THE CALIFORNIA PETROLEUM AND ASPHALT COMPANY, OF SAME PLACE.

CENTRIFUGAL LIQUID-SEPARATOR.

SPECIFICATION forming part of Letters Patent No. 508,270, dated November 7, 1893.

Application filed February 28, 1893. Serial No. 464,034. (No model.)

*To all whom it may concern:*

Be it known that I, ARTHUR F. L. BELL, a citizen of the United States, residing in the city and county of San Francisco, State of California, have invented an Improvement in Centrifugal Liquid-Separators; and I hereby declare the following to be a full, clear, and exact description of the same.

My invention relates to that class of separators, in which a rapidly rotating bowl receives the material and, by centrifugal force, separates the different materials of which it is composed, according to their specific gravities.

My invention consists in a novel construction of the bowl, the general object of which is to direct the materials of greatest specific gravity to and discharge them from the periphery of the bowl continuously while the machine is in operation.

It also consists in novel details of construction, arrangement and combination, as I shall hereinafter fully describe and specifically claim.

In many of the present forms of centrifugal bowls the cylinder has a closed bottom and an open top, or somewhat of the shape of a hollow sphere with an opening in the top. These bowls are used for the separation of various substances such as cream from milk. In separating these two substances, the machine will run for a long time, before the outer part of the bowl will become clogged enough with dirt, to necessitate its being cleaned; and as the bowl has to be thoroughly washed each time in order to keep it clean and sweet so as not to turn the milk sour, the removing of the dirt at the same time that the bowl is washed, does not cause much of an inconvenience; but where the separator is used for operation upon other materials, such as contain more or less sand, silt, or other foreign substances, as, for example, in the separation of the water from mineral oils, mineral pitch, liquid asphaltum, or other kindred substances, it is essential that the bowl shall not become clogged up, but shall continuously clean itself. In attempting the separation of the water from these substances with the form of centrifugal bowls used at the present time for the separation of cream from milk, it has been found impossible to run them for more than a few hours before the sand, silt, or other foreign substances will fill the outer part of the bowl, so that there is no room left to carry on the separation of the other substances in the bowl. The cause of this clogging is due to the sand flying out to the greatest diameter of the bowl and having no direct or immediate exit, lodging against the outer wall of the bowl.

The general object of my invention is, therefore, to dispose of the dirt, sand and other foreign substances from material of this nature, during and together with the separation of the heavier components of the material under treatment, the discharge being continuously effected from the bowl while it is in operation. To this end I have made in the bowl a peripheral discharge opening in the plane or line of its greatest diameter, and in the best form of the bowl I have avoided flat surfaces upon which the sand or silt can lodge, and instead thereof so construct its periphery and the directing plates leading thereto as to present inclined surfaces to the outward movement of the substances to be discharged, whereby they are carried to specified and contracted points in the periphery of the bowl from which they are discharged.

Other objects will appear in the course of the following description in connection with the details of construction.

Figure 2:
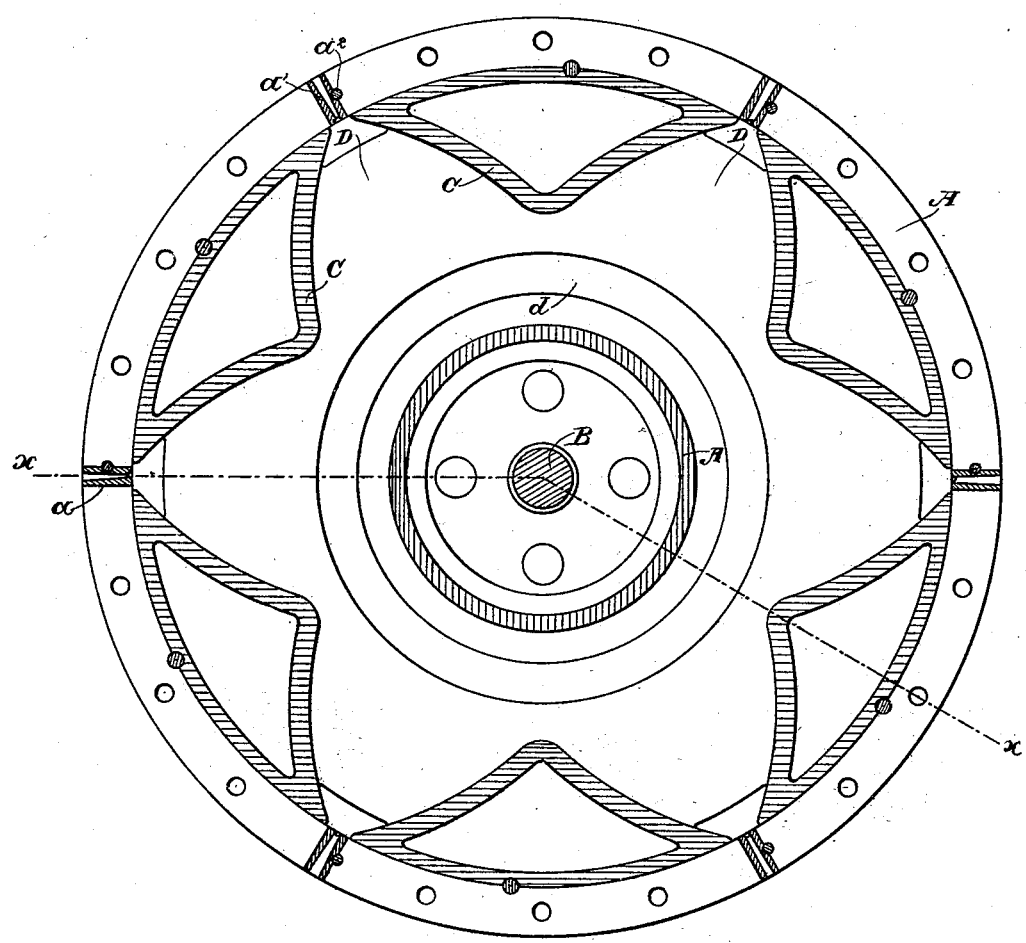

Referring to the accompanying drawings for a more complete explanation of my invention,—Figure 1 is a vertical section of my separator on the line x—x of Fig. 1. Fig. 2 is a horizontal central section looking up from below.

Though, as far as the peripheral form of discharge opening is concerned, the bowl may be of any suitable shape, with straight or inclined walls and having its discharge in the periphery in the line or plane of greatest diameter, I have herein illustrated it in its best form or shape.

A is the bowl. Its wall flares outwardly to a line of greatest diameter. This line may be at the top or bottom of the bowl, the inclination being direct to it: but the best form is that here shown in which it has a double conical shape, its outer walls forming inclined surfaces converging to the plane of greatest diameter, or the meeting lines of the bases of the two cones. In this plane of greatest diameter, is provided a discharge opening which, though it might be continuous, is preferably made in the shape of a number of equi-distant holes $a$, the capacity of which may be varied, as here shown, by forming them in insertible plugs $a'$ secured between the meeting flanges of the bowl and held therein suitably, as by the pins $a^2$. The top of the bowl is open, as shown, and the bottom of it is curved upwardly, forming a center which is secured to the head $b$ of the driving spindle B. Now, it will be seen that the material supplied to the bowl and acted upon by centrifugal force, will be directed outwardly to its inclined walls, and the heavier materials being forced the farthest will be directed by said inclined walls to the peripheral opening of the bowl, from which they will be continuously discharged. On account of the inclination of these walls, there will be no chance for the dirt or sand, or other matter sought to be separated to lodge, but will continuously pass off, thus causing the bowl to be self-cleansing. Where, however, the peripheral opening in the bowl is in the shape of a number of small apertures, it is further necessary to present directing surfaces to the out-throwing material, whereby the heaviest substances are directed accurately to these discharge openings or holes, instead of collecting around the entire line of greatest diameter. Accordingly I have secured within the bowl a series of what may be termed V-shaped directing plates C mounted vertically. These plates have their apices directed toward the center of the bowl while their edges converge to their bases, and their sides diverging, approach the position of the discharge holes, a side of adjacent plates lying on each side thereof. Thus, within the bowl there are presented guide-plates to the outflowing material which will direct it accurately to the discharge holes. It will be observed that the sides of these directing plates are not in straight lines, but are on concave or inward curves. The object of this is to present approximately the same angle of plate to the line of projection of the material throughout the whole surface of the plate, so that the direction of said material by the sides of the plates will be uniform.

In order to discharge the material from the top of the bowl, and to avoid interference with the incoming feed of material, I place within the bowl the diaphragm plates D. These, at their outer ends stop short of the peripheral openings whereby the lighter material will pass around said outer ends. These plates may be horizontal, but the arrangement here shown is one in which they are seated between the sides of adjacent directing plates C, their lower ends extending down to the plane of greatest diameter of the bowl, and their upper ends $d$ projecting inwardly beyond the vertical plane of the apices of said directing plates, thereby causing the inflowing feed to pass down well toward the center of the bowl, without interfering with the discharge of the lighter materials. Between these diaphragm plates and the wall of the bowl there are thus formed passages $d'$ up which the material, after passing around the lower end of said plates, will pass out through the top of the bowl.

E is the frame or stand of the machine. Upon this is supported the outer stationary shell F which encircles the rotating parts within. This shell supports a top ring or band $f$ which in turn supports a cover G having the hinged doors $g$ whereby access may be had to the interior. Through this cover extends a feed pipe $g'$ adapted to direct the material down into the bowl; and in some cases, where the material supplied must be kept hot, the feed pipe is encircled by a steam jacket $g^2$.

Supported by the frame-work E is the sectional steam jacket H, the upper section of which lies just outside of the upper cone of the bowl, while the lower section lies outside the lower cone thereof. A steam pipe I leads into the upper portion of the upper section on one side, and a branch $i$ of said pipe leads into the upper portion of the lower section on the same side, and from the lower portions of said sections on the other side, issue branches $i'$ leading to the discharge pipe $i^2$. Thus a circulation of steam is maintained through the jacket, the water of condensation discharged, and the bowl is kept suitably heated.

The material discharged from the top of the bowl, as heretofore explained, passes over the top of said bowl, and into the space of the top ring under the cover, and down through a discharge pipe J from which it is suitably disposed of. Or the discharge of this lighter material may be effected as is usual in centrifugal separators through a pipe in direct communication with the interior of the bowl.

Having thus described my invention, what I claim as new, and desire to secure by Letters Patent, is—

1. A bowl of a centrifugal separator having its periphery provided in the line or plane of its greatest diameter with a series of separate discharge holes, plugs adapted for insertion in said holes to vary the capacity thereof and pins engaging the plugs and securing them in place.

2. A bowl for a centrifugal separator having inclined walls and provided with discharge holes in the plane or line of its greatest diameter, in combination with the vertically disposed V-shaped plates within the bowl adapted to direct the material to said discharge holes, said plates having inward curved or concaved faces, substantially as herein described.

3. In a centrifugal separator, a bowl having a peripheral discharge opening for the heavier materials, and provided with a diaphragm, the outer edge of which is separated from the discharge opening to permit the passage of the lighter materials around it on the way to their discharge from the top of the bowl, and directing plates within the diaphragm for directing material to the peripheral discharge substantially as herein described.

4. In a centrifugal separator, a bowl having a peripheral discharge opening for the heavier materials, and provided with inclined directing plates and with a diaphragm between said plates and separated from the wall of the bowl to provide a passage for the outflowing lighter materials, substantially as herein described.

5. In a centrifugal separator, the combination of a bowl having inclined walls with discharge holes in the line or plane of its greatest diameter, vertically disposed inclined plates within said bowl adapted to direct the material to the discharge holes and diaphragm plates between the directing plates forming a passage between themselves and the wall of the bowl, substantially as herein described.

6. In a centrifugal separator, the combination of a bowl having inclined walls with discharge holes in the line or plane of its greatest diameter, vertically disposed inclined plates within said bowl adapted to direct the material to the discharge holes, and an inclined diaphragm between the directing plates forming a passage between itself and the wall of the bowl, said diaphragm extending inwardly at the top beyond the vertical planes of the inner ends of the vertically disposed directing plates, substantially as herein described.

7. In a centrifugal separator, the combination of a rotating bowl having outwardly inclined walls with a discharge in the plane or line of its greatest diameter and steam jackets supported without and in proximity to the inclined walls of the bowl, said steam jackets being in separate independent sections, provided with steam inlets near the upper portions of one side, and outlets near the lower portions of the other side, substantially as herein described.

In witness whereof I have hereunto set my hand.

ARTHUR F. L. BELL.

Witnesses:
S. H. NOURSE,
GEO. H. STRONG.